(12) United States Patent
Hamanaka et al.

(10) Patent No.: US 8,107,500 B2
(45) Date of Patent: Jan. 31, 2012

(54) COMMUNICATION CONTROL APPARATUS, COMMUNICATION CONTROL METHOD, AND COMPUTER PROGRAM

(75) Inventors: Akiyoshi Hamanaka, Hachioji (JP); Toru Suneya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 12/190,768

(22) Filed: Aug. 13, 2008

(65) Prior Publication Data

US 2009/0046744 A1   Feb. 19, 2009

(30) Foreign Application Priority Data

Aug. 14, 2007 (JP) .................................. 2007-211388

(51) Int. Cl.
H04J 3/06 (2006.01)
(52) U.S. Cl. .......................... 370/503; 370/252; 370/468
(58) Field of Classification Search .......... 370/200–253, 370/503–545, 352–356, 441, 448, 480–499, 370/321–327, 337–338, 442–444, 468, 473; 709/203; 455/69
See application file for complete search history.

(56) References Cited

U.S. PATENT DOCUMENTS

| | | | | |
|---|---|---|---|---|
| 4,866,704 A | * | 9/1989 | Bergman | 370/452 |
| 5,822,301 A | * | 10/1998 | Arnold et al. | 370/238 |
| 2002/0118953 A1 | * | 8/2002 | Kim | 386/70 |
| 2003/0103243 A1 | | 6/2003 | Watanabe | |
| 2006/0007960 A1 | * | 1/2006 | Liu et al. | 370/503 |
| 2006/0240783 A1 | * | 10/2006 | Kawada | 455/69 |
| 2009/0213845 A1 | * | 8/2009 | Li | 370/352 |

FOREIGN PATENT DOCUMENTS

| | | |
|---|---|---|
| JP | 2003-169090 | 6/2003 |
| JP | 2003-188916 A | 7/2003 |
| JP | 2006-087010 | 3/2006 |
| JP | 2006-332966 A | 12/2006 |

* cited by examiner

*Primary Examiner* — Pao Sinkantarakorn
*Assistant Examiner* — Iqbal Zaidi
(74) *Attorney, Agent, or Firm* — Canon USA, Inc., I.P. Division (57) ABSTRACT

A communication control apparatus includes a packetizing unit configured to generate packets based on coded data; a calculating unit configured to calculate, based on at least one of information regarding the amount of code of the coded data, reception state information indicating a reception state of a reception device serving as a transmission destination to which the packets are to be transmitted, information regarding the effective speed of a communication line to be used for transmission of the packets, and information regarding an available capacity of a communication channel that can be ensured for communication of the packets, the number of packets to be continuously transmitted; and a transmitting unit configured to continuously transmit, via the communication line to the reception device, packets corresponding to the number of packets calculated by the calculating unit.

8 Claims, 8 Drawing Sheets

| | a | b | c |
|---|---|---|---|
| d | $\geq \alpha$ [bps] | $\alpha$ [bps] | $\leq \alpha$ [bps] |
| e | $\leq \beta$ [bps] | $\leq \beta$ [bps] | $\leq \beta$ [bps] |
| f | $\geq \alpha$ [bps] | $\geq \alpha$ [bps] | $\geq \alpha$ [bps] |

COMMUNICATION CONTROL APPARATUS, COMMUNICATION CONTROL METHOD, AND COMPUTER PROGRAM

BACKGROUND OF THE INVENTION

1. Field of the Invention

The present invention relates to a communication control apparatus, a communication control method, and a computer program, and more particularly, to a communication control apparatus, a communication control method, and a computer program that are suitably used for controlling the transmission rate in the case of transmitting packets.

2. Description of the Related Art

As a method for controlling the transmission rate in a global or local manner, a method for controlling transmission intervals for individual packets in accordance with a high-accuracy clock has been proposed, for example, in Japanese Patent Laid-Open No. 2003-169090.

In addition, a method for adjusting the amount of data to be transmitted per unit time so that the traffic varying in a local manner does not exceed a line capacity has been proposed. For example, Japanese Patent Laid-Open No. 2006-87010 describes that a transmission-stoppage start time and a transmission resumption time are designated to provide a transmission stoppage period in the middle of transmission of a desired unit of data that is to be collectively transmitted and that by controlling the transmission stoppage period, the transmission rate can be controlled.

In the methods described above, however, it is necessary to control the transmission rate in a stepless manner. Thus, it is necessary to control the transmission stoppage period or the packet transmission interval in accordance with a clock having a significantly high frequency and a significantly high accuracy.

In addition, in the case of controlling transmission intervals for individual packets, it is necessary to designate a transmission start time for each packet. Thus, a problem occurs in that a large computation load is required for designating the transmission start times.

SUMMARY OF THE INVENTION

The present invention controls, without using a high-frequency and high-accuracy clock, a transmission rate with a small computation load.

A communication control apparatus includes a packetizing unit configured to generate packets based on coded data; a calculating unit configured to calculate, based on at least one of information regarding the amount of code of the coded data, reception state information indicating a reception state of a reception device serving as a transmission destination to which the packets are to be transmitted, information regarding the effective speed of a communication line to be used for transmission of the packets, and information regarding an available capacity of a communication channel that can be ensured for communication of the packets, the number of packets to be continuously transmitted; and a transmitting unit configured to continuously transmit, via the communication line to the reception device, packets corresponding to the number of packets calculated by the calculating unit.

According to an aspect of the present invention, since the transmission rate is controlled without calculating a transmission stoppage timing and a transmission resumption timing, a computation load to be imposed on a control block can be reduced. In addition, control of the transmission rate in a global or local manner equivalent to control in the related art can be achieved, without requiring a high-frequency and high-accuracy clock. Thus, the transmission rate can be controlled with a small computation load, without using a high-frequency and high-accuracy clock.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described with reference to the drawings.

Figure 1:
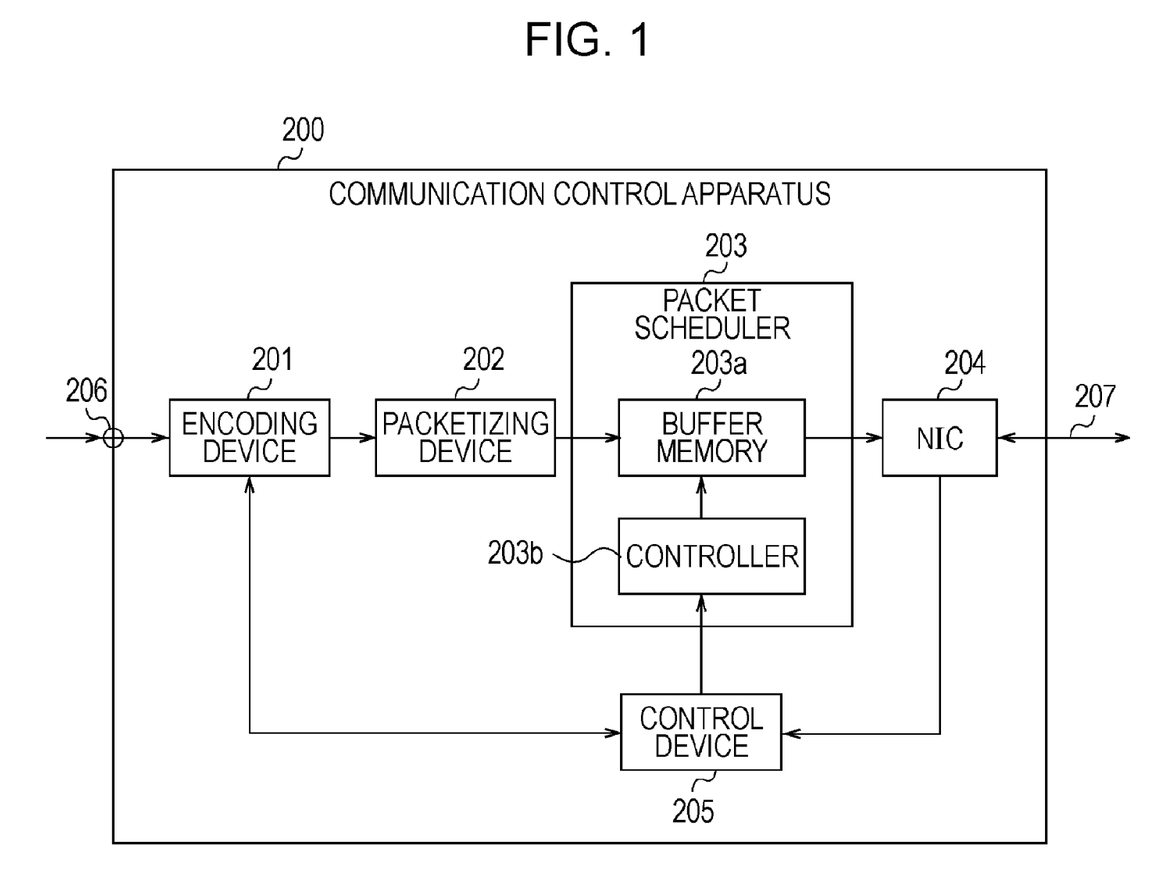
FIG. 1 shows an example of the configuration of a communication control apparatus.

FIG. 1 shows an example of the configuration of a communication control apparatus 200.

Referring to FIG. 1, the communication control apparatus 200 includes an encoding device 201, a packetizing device 202, a packet scheduler 203, a network interface card (NIC) 204, a control device 205, and an input terminal 206.

A digital moving image signal is received at the input terminal 206. The encoding device 201 codes the digital moving image signal into a specific coding format and outputs, as a coded digital moving image signal, to the packetizing device 202. A digital audio signal, as well as a digital moving image signal, may be received at the input terminal 206.

Figure 2:
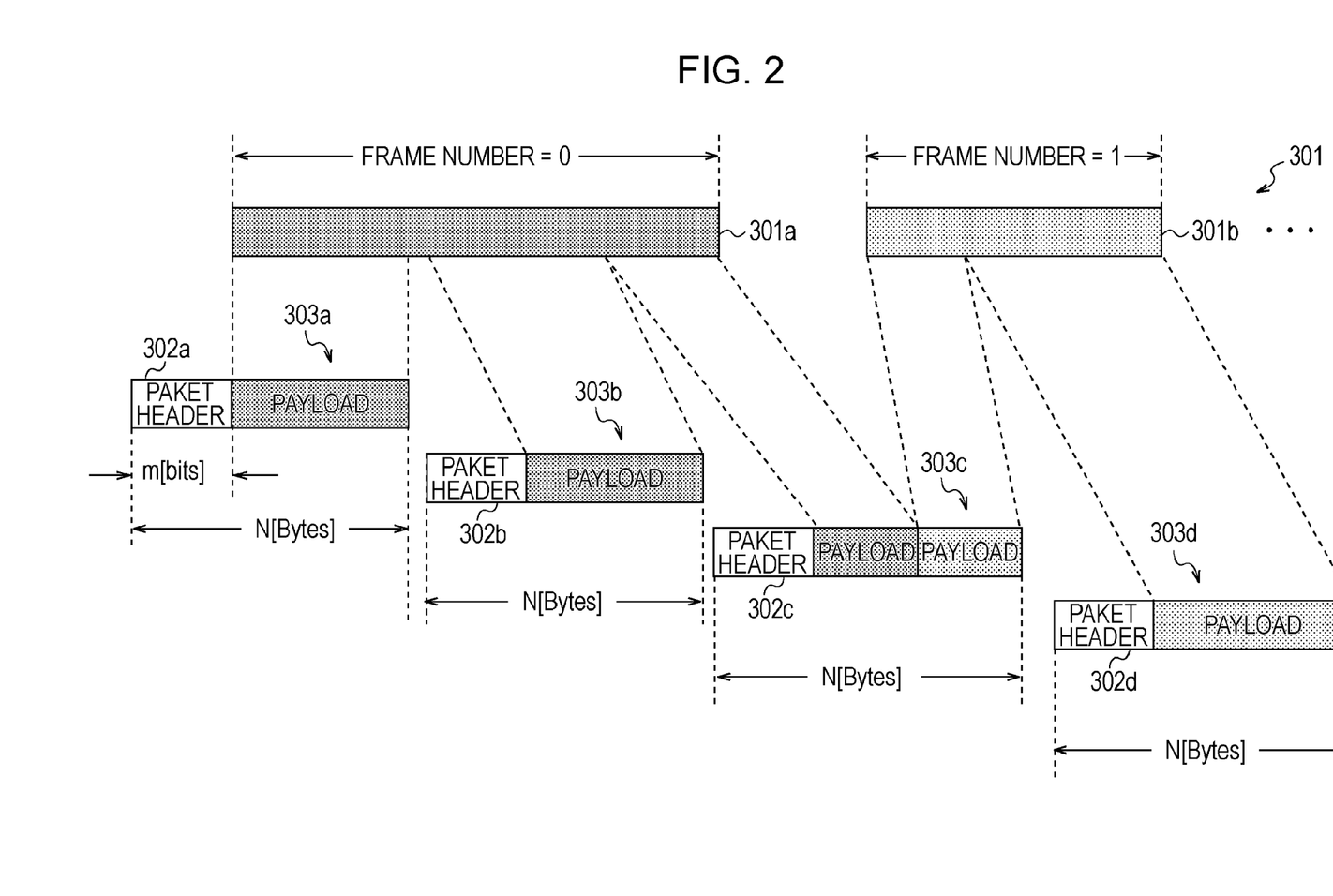
FIG. 2 schematically shows an example in which a packetizing device packetizes a coded digital moving image signal.

FIG. 2 schematically shows an example in which a coded digital moving image signal is packetized by the packetizing device 202.

As shown in FIG. 2, coded digital moving image signals 301a and 301b input to the packetizing device 202 are each divided into packets of a predetermined number of bytes (N bytes) in the order from smaller to larger frame numbers. The packets are provided with packet headers 302a to 302d at the beginnings thereof and are output as packets 303a to 303d. Packets 303 (packetized coded digital moving image signals) are input to the packet scheduler 203. As described above, in this embodiment, a packetizing unit configured to generate the packets 303a to 303d based on the coded digital moving image signals 301a and 301b can be implemented by the packetizing device 202.

The packet scheduler 203 has an internal configuration, as shown in FIG. 1. The packet scheduler 203 includes a buffer memory 203a and a controller 203b. The packets 303a to 303d input to the packet scheduler 203 are temporarily stored (held) in the buffer memory 203a. The controller 203b reads the packets 303, which are temporarily stored in the buffer memory 203a, in such a manner that L packets are read in each reading operation in the order in which the packets 303 were input, in accordance with the number L (L is a natural number) of bursts designated by the control device 205, as described later, and outputs the read packets 303 to the NIC 204. The number of bursts represents the number of packets to be transmitted in a single transmission operation in the case of burst transmission in which a group of packets are collectively transmitted at a time.

It is assumed that the amount of generated code corresponding to a frame whose frame number is 0 (that is, the amount of code of the coded digital moving image signal 301a) shown in FIG. 2 is equivalent to twenty packets. In addition, the number L of bursts designated to the controller 203b by the control device 205 is five (that is, L=5).

In accordance with the number of bursts designated by the control device 205 (in this case, L=5), the controller 203b reads five packets 303 from the buffer memory 203a in the order in which the packets 303 were input to the controller 203b.

Figure 3:
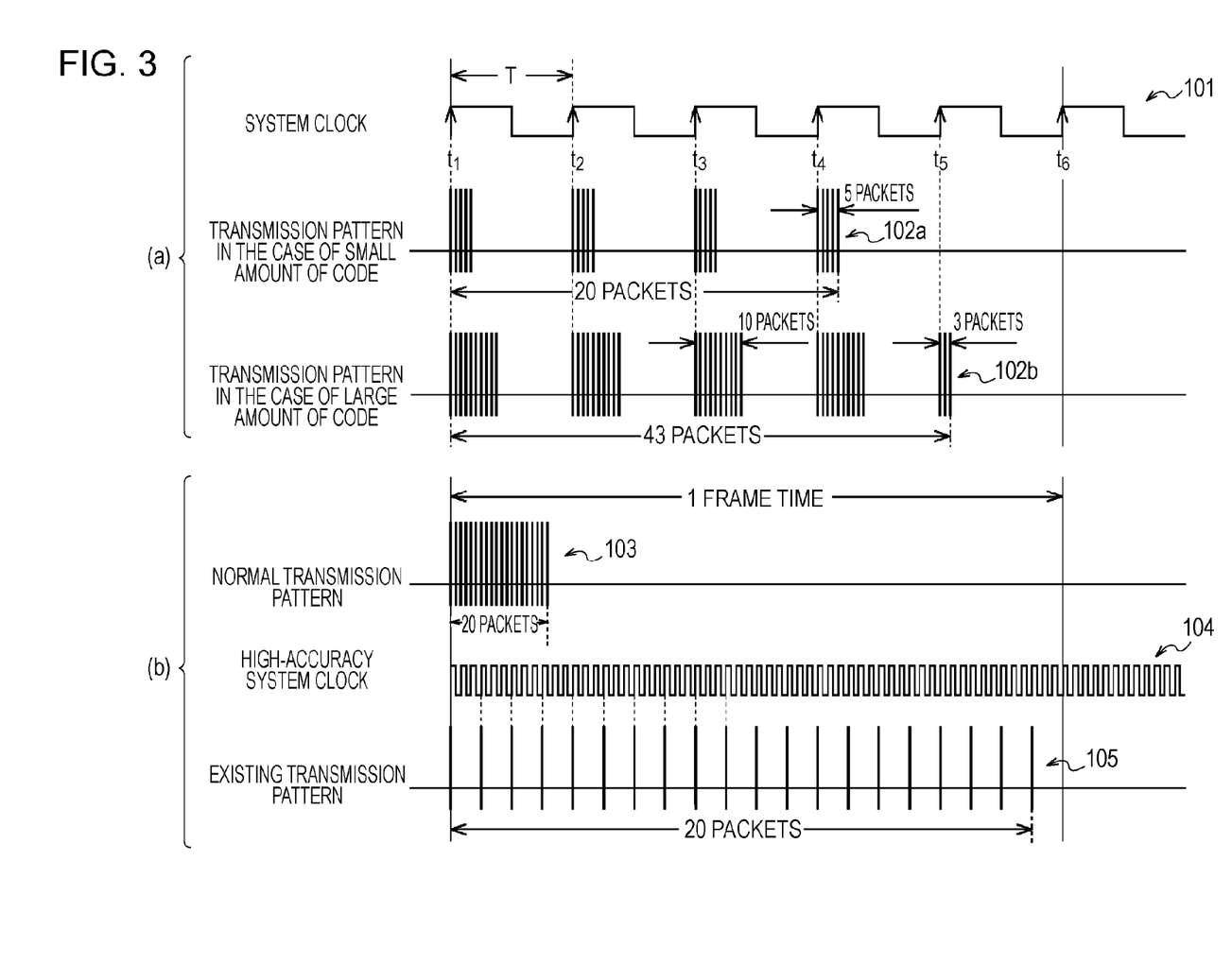
FIG. 3 shows examples of transmission patterns of packets transmitted from communication control apparatuses.

Parts (a) and (b) of FIG. 3 are charts showing examples of transmission patterns of packets transmitted from communication control apparatuses. More specifically, part (a) of FIG. 3 shows examples of transmission patterns of the packets 303 transmitted from the communication control apparatus 200 according to this embodiment. In part (a) of FIG. 3, a system clock 101 and transmission patterns 102a and 102b in a case where the packets 303 are transmitted with the transmission rate being controlled are shown. The transmission pattern 102a represents a transmission pattern in a case where the relative amount of code of the coded digital moving image signal 301 is small, and the transmission pattern 102b represents a transmission pattern in a case where the relative amount of code of the coded digital moving image signal 301 is large. Part (b) of FIG. 3 shows known transmission patterns of packets. In part (b) of FIG. 3, a normal transmission pattern 103 in a case where packets are transmitted without the transmission rate being controlled, a system clock 104, and a known transmission pattern 105 in a case where packets are transmitted with the transmission rate being controlled are shown.

As shown in part (b) of FIG. 3, in a known transmission pattern, the system clock 104, which is highly accurate, is necessary. In contrast, as shown in part (a) of FIG. 3, the communication control apparatus 200 according to this embodiment is configured such that the packets 303 are read from the buffer memory 203a in synchronization with the normal system clock 101, which is normally provided in the communication control apparatus 200. As described above, in this embodiment, the communication rate (the transmission rate) can be controlled by using the system clock 101, which has a low frequency and low accuracy compared with the system clock used in the known transmission pattern.

For example, any one of the following frequencies (1) to (4) can be used as the frequency of the system clock 101 normally provided in the communication control apparatus 200 according to this embodiment:

(1) 90×N [KHz] or 90×1/N [KHz] (N is a positive integer)

(2) 44.1×N [KHz] or 44.1×1/N [KHz] (N is a positive integer)

(3) 48×N [KHz] or 48×1/N [KHz] (N is a positive integer)

(4) horizontal synchronization frequency of moving image signal (for National Television Standards Committee (NTSC), 15.736 [KHz])×N [KHz] or horizontal synchronization frequency of moving image signal×1/N [KHz](N is a Positive Integer)

However, the frequency of the system clock 101 is not necessarily limited to the examples listed above. Any frequency may be adopted as the frequency of the system clock 101 as long as the frequency can be used for controlling the transmission rate of the packets 303. For example, a frequency that is obtained by dividing a video sampling frequency (for example, 27 MHz or 13.5 MHz) at a desired frequency division ratio may be adopted as the frequency of the system clock 101. Alternatively, a frequency that is obtained by multiplying or dividing an audio sampling frequency other than 44.1 KHz or 48 KHz at a desired magnification or a desired frequency division ratio may be adopted as the frequency of the system clock 101.

Alternatively, a plurality of frequencies may be adopted for the system clock 101. For example, 48 KHz and a frequency obtained by multiplying 48 KHz by N or dividing 48 KHz by N may be selected or 48 KHz and 44.1 KHz may be selected. In such cases, the system clock 101 may be configured to be dynamically switchable.

Figure 4:
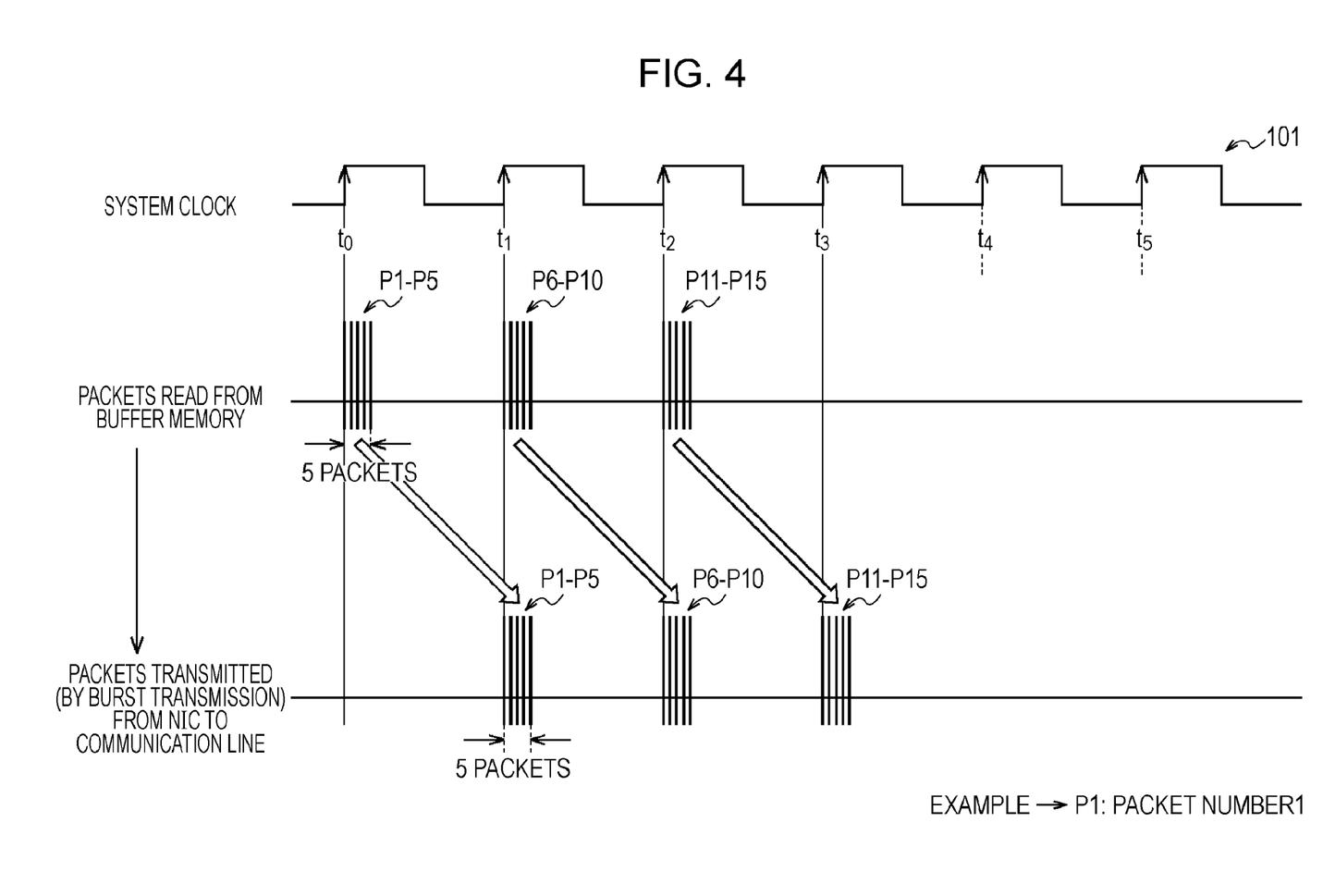
FIG. 4 shows an example of the relationship between packets read from a buffer memory and packets transmitted (by burst transmission) from an NIC.

FIG. 4 shows an example of the relationship between packets read from the buffer memory 203a and packets continuously transmitted (by burst transmission) from the NIC 204.

As shown in FIG. 4, at time t0, the controller 203b reads, from the buffer memory 203a, five packets P1 to P5, which correspond to the number of bursts designated by the control device 205, in the order in which the packets P1 to P5 were input to the buffer memory 203a. Then, the controller 203b outputs the read packets P1 to P5 to the NIC 204.

The five packets P1 to P5 input to the NIC 204 are written to a buffer provided in the NIC 204. The packets P1 to P5 are temporarily stored in the buffer until a timing at which the system clock 101 rises next time (that is, the next rising edge of the system clock 101 occurs). In the description below, a timing at which the system clock 101 rises (that is, a timing at which a rising edge of the system clock 101 occurs) is referred to as a "clock timing" where necessary.

In the example shown in FIG. 4, at time $t_1$, which is the next clock timing, the five packets P1 to P5 are read from the buffer provided in the NIC 204. The read five packets P1 to P5 are transmitted to a communication line 207 (network) under the control of hardware logic or driver software of the NIC 204. Accordingly, a packet interval in the case of transmitting packets to the network is determined in accordance with the clock of the NIC 204 and the details of the hardware logic or the programming of the driver software.

As shown in part (a) of FIG. 3 (or FIG. 4), at time $t_1$, the next five packets P6 to P10 are read, from the buffer memory 203a provided inside the packet scheduler 203, in the order in which the packets P6 to P10 were input to the buffer memory 203a, and the read packets P6 to P10 are input to the NIC 204. Then, the packets P6 to P10 input to the NIC 204 are temporarily stored in the buffer provided in the NIC 204 until time $t_2$, which is the next clock timing (burst transmission timing).

At time $t_2$, the five packets P6 to P10, which correspond to the number of burst frames, are read from the buffer provided in the NIC 204, and the read five packets P6 to P10 are transmitted (by burst transmission) to the communication line 207 (network). The above-described operation is repeatedly performed.

As described above, in this embodiment, a communication unit can be implemented by the NIC 204. The system clock 101 shown in part (a) of FIG. 3 is the same as the system clock 101 shown in FIG. 4. In addition, the packets P1 to P15 shown in FIG. 4 correspond to the packets 303a to 303d shown in FIG. 2.

Referring back to FIG. 1, in accordance with a desired statistical analysis method, the control device 205 processes all or part of reception state information transmitted from a reception terminal device (reception device), which is a transmission destination to which packets are to be transmitted. The reception terminal device transmits the reception state information to the control device 205 by using additional information of a desired communication unit or a real-time transport protocol control protocol (RTPCP). With the execution of the processing, the control device 205 is capable of calculating the number Li of bursts for which the probability of occurrence of packet loss in the case where, for example, burst transmission is performed at a cycle T of the system clock 101 is minimum. In addition, the control device 205 calculates the maximum amount Rx of code that can be transmitted within one frame period in the case of the calculated number Li of bursts.

The reception state information is, for example, information including at least one of the packet loss rate (or the number of packet losses), the error rate, the number of missing packets, the occupancy of the reception buffer, the maximum reception bit rate, the minimum reception bit rate, and the average reception bit rate.

Then, the control device 205 compares the amount Rr of code of a frame to be transmitted with the maximum amount Rx of code that can be transmitted within the one frame period. If it is determined, in accordance with a result obtained by the comparison, that the maximum amount Rx of code that can be transmitted within the one frame period is equal to or larger than the amount Rr of code of the frame to be transmitted (that is, $Rx \geq Rr$), the control device 205 sets the number L of bursts at the number Li of bursts calculated as described above (that is, L=Li). If it is determined, in accordance with a result obtained by the comparison, that the maximum amount Rx of code that can be transmitted within the one frame period is smaller than the amount Rr of code of the frame to be transmitted (that is, Rx<Rr), the control device 205 calculates the number Lx of bursts for which the condition $Rx \geq Rr$ is met. Then, the number L of bursts is set at the number Lx of bursts calculated as described above (that is, L=Lx).

The control device 205 designates to the packet scheduler 203 the number L of bursts calculated as described above.

Basically, the processing for calculating the number Li of bursts and the processing for calculating the number Lx of bursts can be performed for each frame. However, in order to reduce the processing load to be imposed on the control device 205 and to ensure an adequate image quality, the number Li of bursts and the number Lx of bursts may be calculated as described below. That is, the number Li of bursts and the number Lx of bursts may be calculated in every cycle based on a desired number of frames. Alternatively, the number Li of bursts and the number Lx of bursts may be calculated for each frame in an intra-coded mode or for each frame in which a change in the amount of code exceeds a threshold set in a desired manner.

As described above, in this embodiment, burst transmission starts at a timing at which the system clock 101 rises. Then, after packets corresponding to the number L of bursts designated by the control device 205 are continuously transmitted, a transmission stoppage period starts and continues until the system clock 101 rises next time.

An example of a process to be performed by the communication control apparatus 200 for calculating the number L of bursts and performing burst transmission will be described with reference to a flowchart shown in FIG. 5.

As described above, the number L of bursts can be dynamically changed for each desired unit. However, it is rational and desirable, from a practical point of view, that the number L of bursts is changed for each intra-coded frame in which the amount of generated code increases.

The control device 205 determines, for each frame to be processed, in which coded mode the frame is set (step S601). If it is determined that the intra-coded mode is set (YES in step S601), the control device 205 acquires from the encoding device 201 the amount of code of the intra-coded frame (step S602). As described above, in this embodiment, a detecting unit can be implemented by the execution of the processing of step S601 and an acquiring unit can be implemented by the execution of the processing of step S602.

Then, the control device 205 performs the following first to third processing (steps S603 to S608) in a parallel manner or in a time-series manner while referring to the reception state information transmitted from the reception terminal device and received by the NIC 204, and calculates the numbers L1 to L3 of bursts.

As the first processing, the control device 205 compares the packet loss rate with the reception rate varying in a time-series manner (step S603). Then, in accordance with a result obtained by the comparison, the control device 205 calculates the number L1 of bursts for which the packet loss rate is minimum (step S606).

For the first processing, a point defined by a reception rate, a packet loss rate, and a corresponding number of bursts is plotted on a three-dimensional coordinate, and the plotted data is stored as a database during a desired storage period.

In this embodiment, a storing unit can be implemented by the above-described processing. For example, after acquiring the total amount of code of the intra-coded frame in step S602, the control device 205 reads, from the database, the reception rate R and the number L1 of bursts for which the minimum packet loss rate is achieved. Accordingly, the processing of steps S603 and S606 can be performed.

As the second processing, the control device 205 compares the reception buffer occupancy with the packet loss rate varying in a time-series manner (step S604). Then, in accordance with a result obtained by the comparison, the control device 205 calculates the number L2 of bursts for which the packet loss rate is minimum (step S607).

For the second processing, a point defined by a reception buffer occupancy, a packet loss rate, and a corresponding number of bursts is plotted on a three-dimensional coordinate, and the plotted data is stored as a database during a desired storage period. In this embodiment, a storing unit can be implemented by the above-described processing. For example, after acquiring the total amount of code of the intra-coded frame in step S602, the control device 205 reads, from the database, the reception buffer occupancy Q and the number L2 of bursts for which the minimum packet loss rate is achieved. Accordingly, the processing of steps S604 and S607 can be performed.

As the third processing, the control device 205 compares the reception buffer occupancy with the reception rate varying in a time-series manner (step S605). Then, in accordance with a result obtained by the comparison, the control device 205 calculates the number L3 of bursts for which the probability of occurrence of overflow (OF) and the probability of occurrence of underflow (UF) in the reception buffer are minimum (step S608).

For the third processing, a point defined by a reception rate, a reception buffer occupancy, and a corresponding number of bursts is plotted on a third-dimensional coordinate, and the plotted data is stored as a database during a desired storage period. In this embodiment, a storing unit can be implemented by the above-described processing. For example, after acquiring the total amount of code of the intra-coded frame in step S602, the control device 205 reads, from the database, the maximum number L3 of bursts for which overflow or underflow does not occur. Accordingly, the processing of steps S605 and S608 can be performed.

As described above, in this embodiment, with the execution of the first to third processing, all or part of reception state information is processed using the statistical analysis method.

After obtaining the numbers L1 to L3 of bursts, the control device 205 calculates times TL(L1), TL(L2), and TL(L3) required for burst transmission of the amount of code of the intra-coded frame, based on the obtained numbers L1 to L3 of bursts (step S609).

Then, the control device 205 compares each of the times TL(L1), TL(L2), and TL(L3) obtained in step S609 with one frame time (that is, the reciprocal of the frame rate [sec]). Then, the control device 205 determines whether each of the times TL(L1), TL(L2), and TL(L3) is smaller than or equal to the one frame time and selects the numbers Lx (x is 1, 2, and 3) of bursts for which the times TL(L1), TL(L2), and TL(L3) are smaller than or equal to the one frame time (step S610).

If the number of selected numbers Lx of bursts is one, the control device 205 substitutes the selected number Lx of bursts for the number L of bursts and designates to the packet scheduler 203 the number L of bursts. If the number of selected numbers Lx of bursts is two or more, the control device 205 substitutes the minimum number Lx of the selected numbers Lx of bursts and designates to the packet scheduler 203 the minimum number Lx of bursts (step S611). As described above, in this embodiment, a calculating unit can be implemented by the execution of the processing of steps S603 to S611.

Then, the packet scheduler 203 outputs to the NIC 204 packets corresponding to the designated number L of bursts and instructs the NIC 204 to perform burst transmission of the packets. Then, the NIC 204 performs transmission of the packets (step S612). Accordingly, burst transmission of the packets from the communication control apparatus 200 via the communication line 207 to the reception terminal device is performed. In this embodiment, a transmitting unit can be implemented by the execution of the processing of step S612.

If it is determined, in accordance with a result obtained by the comparison in step S610, that the numbers Lx of bursts for which the times TL(L1) to TL(L3) are smaller than or equal to the one frame time do not exist (NO in step S610), the control device 205 performs the following processing. That is, the control device 205 calculates the number Lt of bursts for which a time TL(Lt) is smaller than or equal to one frame time (that is, TL(Lt)≦one frame time). Then, the control device 205 substitutes the obtained number Lt of bursts for the number L of bursts, and designates to the packet scheduler 203 the number L of bursts (step S613).

The number Lt of bursts can be calculated, for example, as described below.

The number Nb of times that burst transmission can be performed within one frame time can be expressed using equations (1) and (2), where "Tf" represents a time corresponding to one frame, "T" represents a cycle of the system clock 101 shown in part (a) of FIG. 3, "Ri" represents the amount of generated code of an intra-coded frame, and "Rp" represents the amount of code that can be transmitted per packet:

$$Nb=(Tf/T) \quad (1)$$

$$Nb=(Tf/T)+1 \quad (2)$$

A value calculated from equation (1) is a value obtained in a case where the remainder obtained by dividing the time Tf corresponding to one frame by the cycle T of the system clock 101 is 0. A value calculated from equation (2) is a value obtained in a case where the remainder obtained by dividing the time Tf corresponding to one frame by the cycle T of the system clock 101 is greater than 0.

In addition, the number Np of packets necessary for transmitting the total amount of code of an intra-coded frame is expressed using the following equations (3) and (4):

$$Np=(Ri/Rp) \quad (3)$$

$$Np=(Ri/Rp)+1 \quad (4)$$

A value calculated from equation (3) is a value obtained in a case where the remainder obtained by dividing the amount Ri of generated code of an intra-coded frame by the amount Rp of code that can be transmitted per packet is 0. A value calculated from equation (4) is a value obtained in a case where the remainder obtained by dividing the amount Ri of generated code of an intra-coded frame by the amount Rp of code that can be transmitted per packet is greater than 0.

In addition, the number Lt of bursts can be expressed using the following equations (5) and (6), where "Nb" represents the number of times that burst transmission can be performed within one frame time and "Np" represents the number of packets necessary for transmitting the total amount of code of an intra-coded frame:

$$Lt=(Np/Nb) \quad (5)$$

$$Lt=(Np/Nb)+1 \quad (6)$$

A value calculated from equation (5) is a value obtained in a case where the remainder obtained by dividing the number Np of packets necessary for transmitting the total amount of code of an intra-coded frame by the number Nb of times that burst transmission can be performed within one frame time is 0. A value calculated from equation (6) is a value obtained in a case where the remainder obtained by dividing the number Np of packets necessary for transmitting the total amount of code of an intra-coded frame by the number Nb of times that burst transmission can be performed within one frame time is greater than 0.

Accordingly, the control device 205 is capable of calculating the number Lt of bursts in accordance with calculations using equations (1) to (6).

In this embodiment, basically, the number L of bursts determined (calculated) in step S611 or S613 is not updated until the next intra-coded frame appears. Thus, the number Lt of bursts calculated in step S613 is used only for the intra-coded frame. For a non-intra-coded frame prior to the next intra-coded frame, burst transmission is performed in accordance with the number L of bursts calculated (updated) immediately before burst transmission based on the number Lt of bursts (that is, in accordance with the number L of bursts that was adopted before transmission using the number Lt of bursts).

However, in a case where the number Lt of bursts is adopted for transmission of an intra-coded frame, the processing described below may be performed in accordance with an application. That is, the control device 205 may be configured or programmed in such a manner that the number Lt of bursts calculated in step S613 is substituted for the number L of bursts (that is, L=Lt) and the number Lt of bursts is adopted until the number L of bursts is updated for the next intra-coded frame.

After detecting, in accordance with a signal transmitted from the NIC 204, that transmission regarding the amount of code of the intra-coded frame has been completed, the control device 205 determines, in accordance with a signal transmitted from the NIC 204, whether the frame for which completion of transmission has been detected is the last frame (step S614). If it is determined that the frame for which completion of transmission has been detected is the last frame (YES in step S614), the process is terminated. If it is determined that the frame for which completion of transmission has been detected is not the last frame (NO in step S614), the control device 205 selects the next frame (step S615) and determines whether the frame is in the intra-coded mode (step S601).

The determination of whether the frame for which completion of transmission has been detected is the last frame can be performed, for example, as described below. The encoding device 201 determines whether a reception buffer provided in the encoding device 201 is empty. If it is determined that the reception buffer provided in the encoding device 201 is empty, a flag or code indicating that the frame for which completion of transmission has been detected is the last frame is presented to the control device 205. In accordance with the flag or code, the control device 205 is capable of determining that the frame for which completion of transmission has been detected is the last frame.

If the encoding device 201 has not received data of the next frame to be coded for a predetermined period of time, the encoding device 201 determines that the immediately previous frame is the last frame. Thus, the encoding device 201 presents to the control device 205 a flag or code indicating that the immediately previous frame is the last frame. Thus, in accordance with the flag or code, the control device 205 is capable of determining that the immediately previous frame is the last frame.

Alternatively, the encoding device 201 may output, with desired time intervals, to the control device 205 buffer state information indicating the state (occupancy) of the reception buffer provided in the encoding device 201. In this case, in accordance with the buffer state information, the control device 205 is capable of determining whether a frame is the last frame.

As described above, in this embodiment, the number of bursts (that is, the number of packets) to be continuously transmitted in a single burst transmission operation is calculated in accordance with reception state information of the reception terminal device, for example, every time an intra-coded frame is processed. Then, burst transmission of packets corresponding to the calculated number of bursts is performed in synchronization with a timing at which the system clock 101 rises. In addition, a transmission stoppage period automatically starts and continues, without performing burst transmission, until a timing at which the system clock 101 rises next time. Thus, the transmission rate can be properly controlled in a global or local manner without controlling the transmission rate by calculating a transmission stoppage timing and a transmission resumption timing. Thus, computation load is reduced without the use of a high-frequency and high-accuracy clock.

As described above, in this embodiment, the number of bursts to be transmitted in a single burst transmission operation is calculated in accordance with the reception state information received from the reception terminal device. However, the number of bursts is not necessarily calculated in accordance with the reception state information. The number of bursts may be calculated in accordance with at least one of the effective speed of the communication line 207 to be used for communication of packets and the available capacity of a communication channel that can be ensured for communication of the packets, instead of or in addition to the reception state information.

Figure 6A:
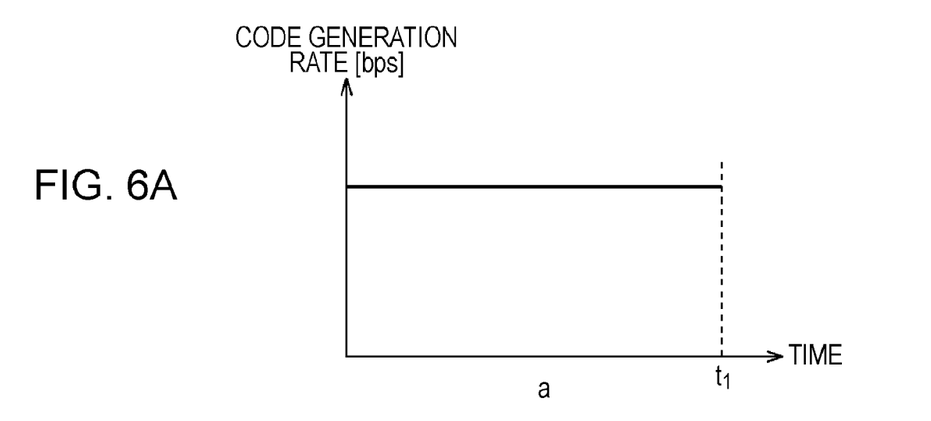
FIGS. 6A, 6B, and 6C each shows an example of information on a transition in the amount of code generated per unit time (the code generation rate).
Figure 6B:
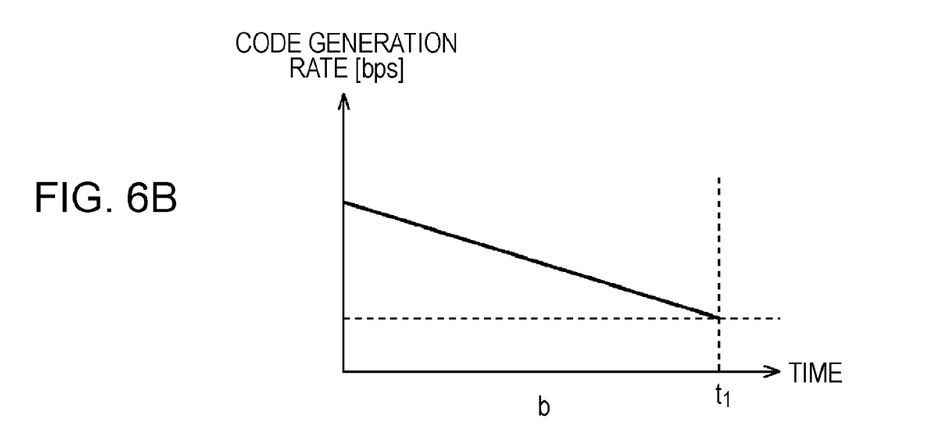
Figure 6C:
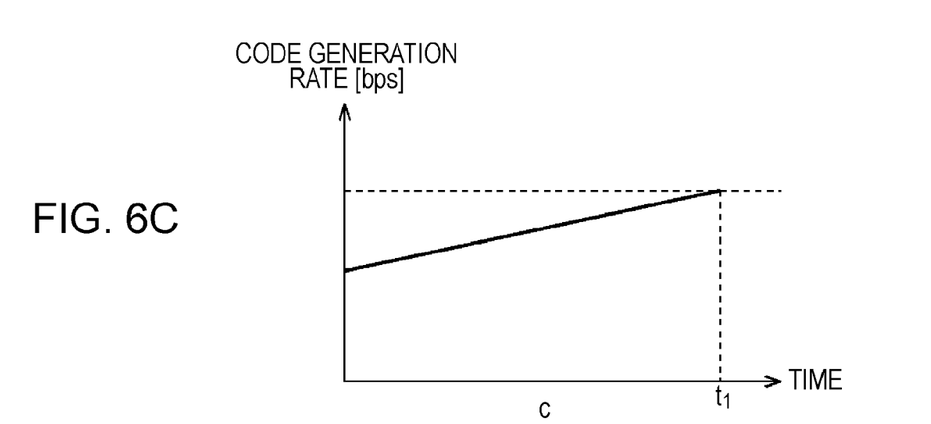
Figure 7A:
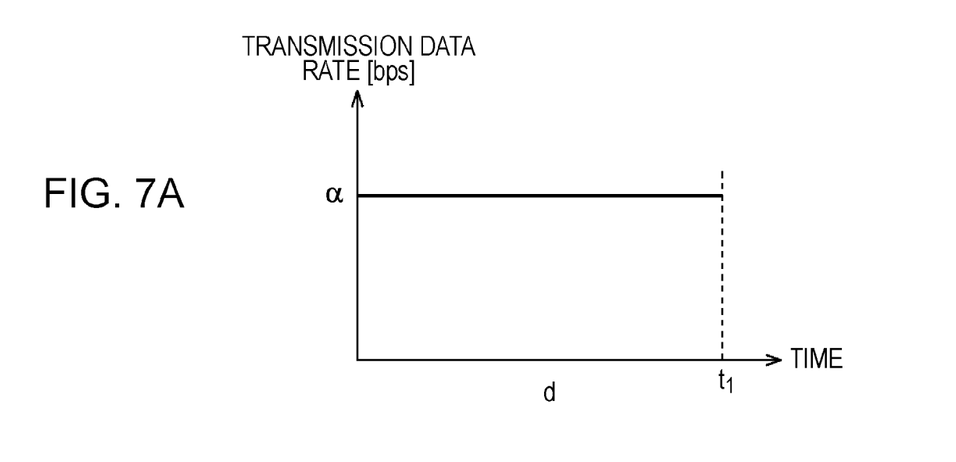
FIGS. 7A, 7B, and 7C each shows an example of information on a transition in the amount of data transmitted per unit time (the transmission data rate).
Figure 7B:
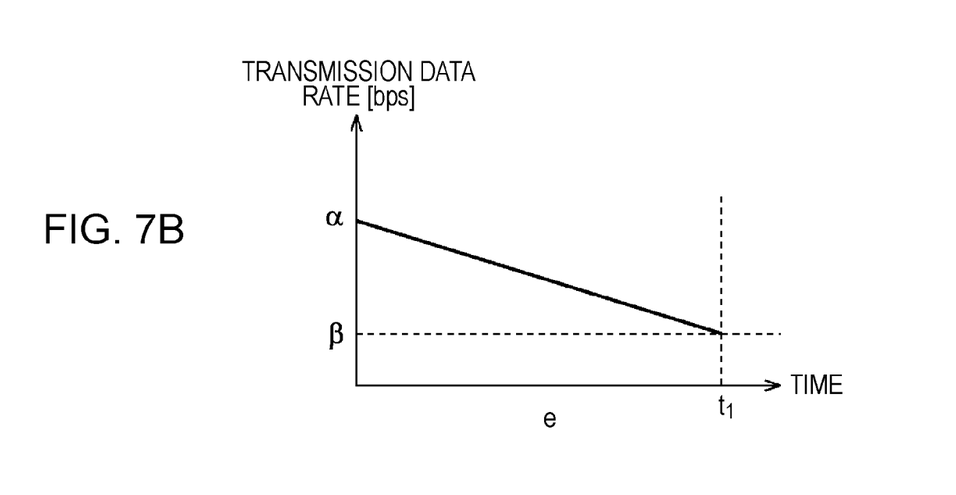
Figure 7C:
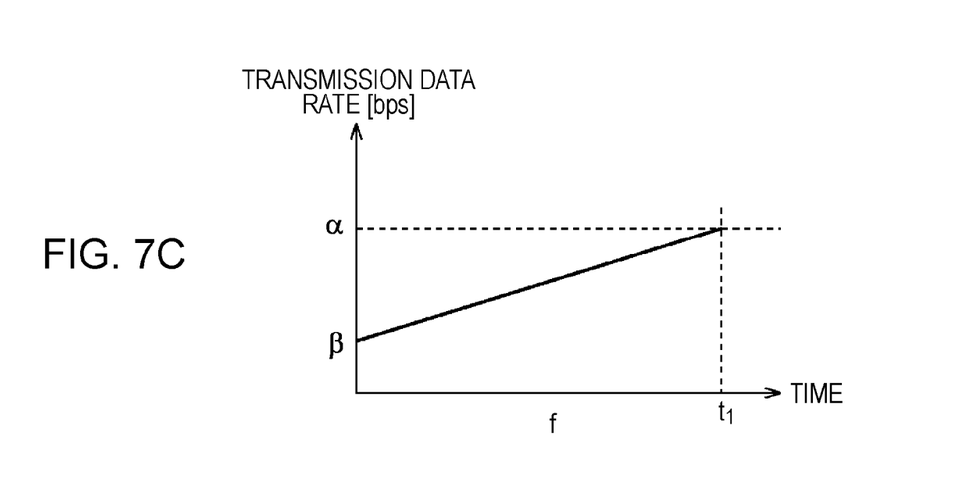

For example, the control device 205 is capable of estimating the current effective speed of the communication line 207 by acquiring the following information (i) and (ii) from the NIC 204:

(i) information on a transition in the amount of code generated per unit time or information on a transition in the amount of data written to a buffer per unit time (ii) information on the transmission bit rate or information on a transition in the transmission bit rate FIGS. 6A to 6C show examples of "information on a transition in the amount of code generated per unit time (or in the code generation rate)" that the control device 205 acquires from the NIC 204. Information shown in FIGS. 6A to 6C corresponds to information (i). FIGS. 7A to 7C show examples of "information on a transition in the amount of data transmitted per unit time (or in the transmission data rate)" that the control device 205 acquires from the NIC 204. Information shown in FIGS. 7A to 7C corresponds to information (ii).

The control device 205 estimates the effective speed of the communication line 207 at present time $t_1$ in accordance with a combination of the acquired information (i) and information (ii).

Figure 8:
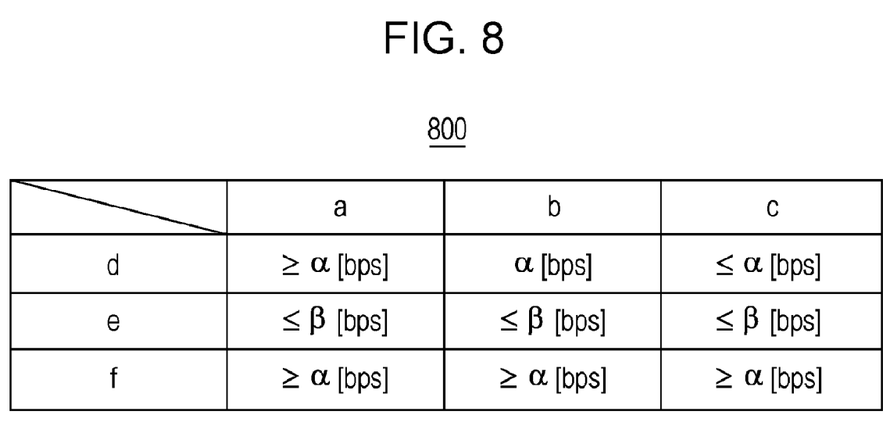
FIG. 8 shows an example of a table to be used when the communication control apparatus estimates the effective speed of a communication line.

FIG. 8 shows an example of a table to be used when the control device 205 estimates the effective speed of the communication line 207.

For example, in the case that the information shown in FIG. 6A and the information shown in FIG. 7A are acquired, the control device 205 determines that the code generation rate and the transmission data rate are each constant. In this case, the control device 205 refers to field "a" and field "d" in a table 800 shown in FIG. 8 and estimates that the effective speed (line speed) of the communication line 207 at present time $t_1$ is equal to or more than α bps. In the case that the information shown in FIG. 6A and the information shown in FIG. 7B are acquired, the control device 205 determines that the code generation rate is constant, whereas the transmission data rate decreases. In this case, the control device 205 refers to field "a" and field "e" in the table 800 and estimates that the effective speed (line speed) of the communication line 207 at present time $t_1$ is equal to or less than β bps.

In the case that the information shown in FIG. 6A and the information shown in FIG. 7C are acquired, the control device 205 determines that the code generation rate is constant, whereas the transmission data rate increases. In this case, the control device 205 refers to field "a" and field "f" in the table 800 and estimates that the effective speed (line speed) of the communication line 207 at present time $t_1$ is equal to or more than α bps. For other combinations, the control device 205 is capable of estimating the effective speed (line speed) of the communication line 207 at present time $t_1$ in a similar manner.

The available capacity of a communication channel that can be ensured for communication can be acquired as described below. For example, it is assumed that the communication control apparatus 200, the reception terminal device, and a wireless access point conform to IEEE 802.11e. In a case where moving image content is distributed in a streaming manner between the communication control apparatus 200 and the reception terminal device, the communication control apparatus 200 requests the wireless access point for a necessary line capacity. In response to the request, the wireless access point examines the currently available line capacity and the request received from the communication control apparatus 200 taking into consideration the priority of the communication control apparatus 200, and notifies the communication control apparatus 200 of the available line capacity that can be ensured. In this case, if the communication control apparatus 200 has a low priority, the line capacity is provided on a best effort basis. As described above, the communication control apparatus 200 is capable of acquiring the available capacity of a communication channel.

In the case that the amount of generated code for each frame can be estimated or known, the number L of bursts can be updated (or calculated) as described below. A threshold is set for the amount of generated code for each frame or the rate of change (gradient) in the amount of generated code for each frame. In the case that it is determined that the amount of generated code of the current frame exceeds the threshold or the rate of a change in the amount of code of the current frame to a change in the amount of code of the previous frame exceeds the threshold, the number L of bursts is updated (or calculated).

In addition, although an example of a system in which an operation is performed in synchronization with occurrence of a rising edge of the system clock 101, as shown in FIGS. 3 and 4, has been described in this embodiment, an operation is not necessarily performed as described above. For example, an operation may be performed in synchronization with occurrence of a falling edge of the system clock 101 or in synchronization with occurrences of rising and falling edges. Alternatively, a timing for performing burst transmission may be calculated on the basis of the system clock 101. That is, a timing for performing burst transmission may be determined in any way as long as burst transmission is performed on the basis of the system clock 101.

Other Embodiments

The units constituting the communication control apparatus according to the above-described embodiments of the present invention and the steps for the communication control method can be implemented by an operation of a program stored in a random-access memory (RAM), a read-only memory (ROM), or the like of a computer. Such a program and a computer-readable recording medium on which such a program is recorded fall within the scope of the present invention.

In addition, an embodiment may be implemented by any form, such as a system, an apparatus, a method, a program, or a storage medium. More specifically, an aspect of the present invention may be applied to a system constituted by a plurality of apparatuses or equipment constituted by a single apparatus.

Figure 5:
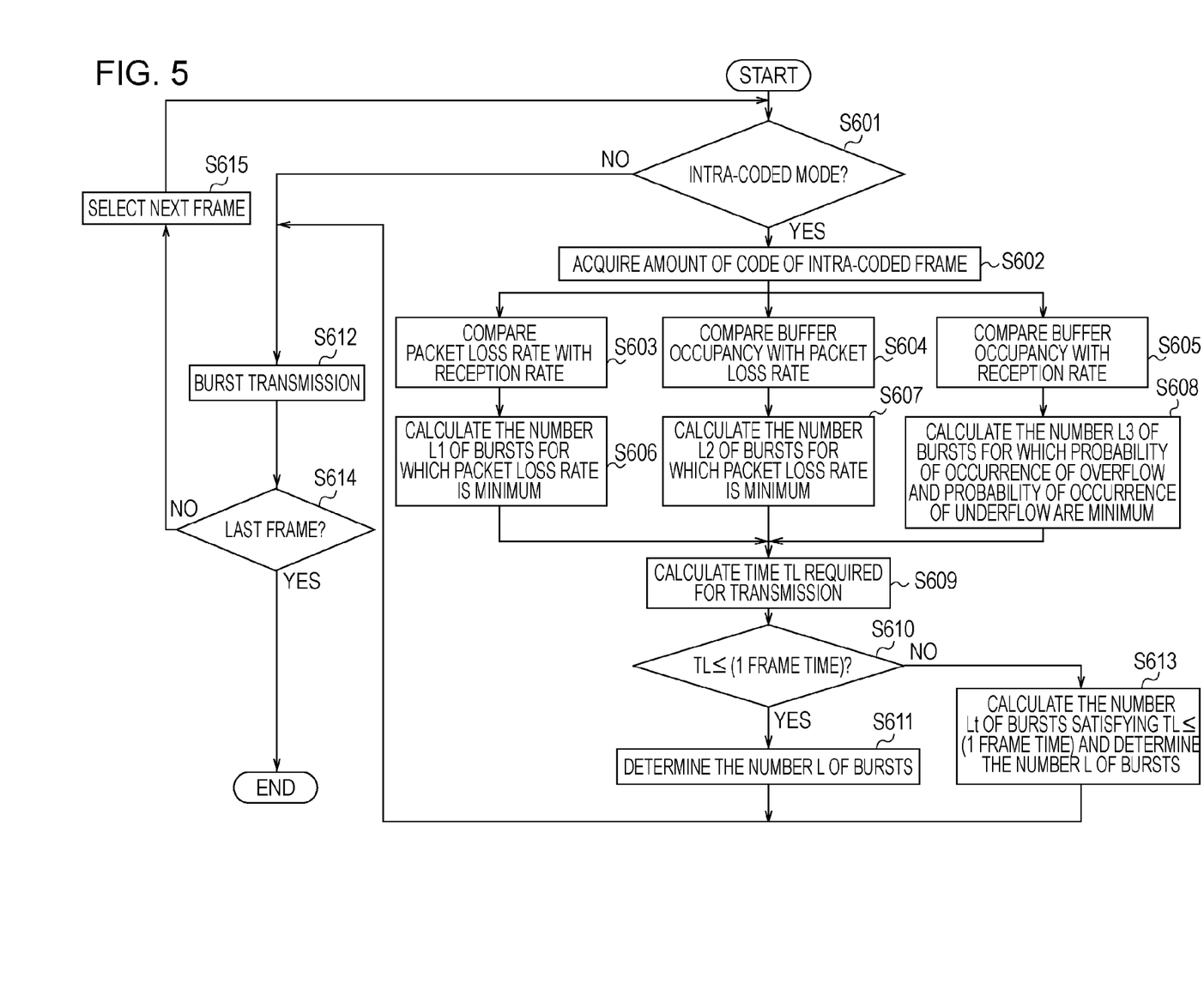
FIG. 5 is a flowchart showing an example of a process to be performed by the communication control apparatus for calculating the number of bursts and performing burst transmission.

According to an aspect of the present invention, a program of software implementing the functions of the above-described embodiments (in the above-described embodiments, a program corresponding to the flowchart shown in FIG. 5) is supplied to the system or the apparatus directly or via remote control. In addition, an aspect of the present invention can also be attained when a computer of the system or the apparatus reads and executes supplied program code.

Thus, program code itself installed into the computer in order to implement functional processing of an aspect of the present invention also implements an aspect of the present invention. That is, a computer program itself for attaining functional processing of an aspect of the present invention also falls within the scope of the present invention.

In this case, the computer program may be of any type, such as object code, a program to be executed by an interpreter, or script data to be supplied to an operating system (OS), as long as it has a function of a program.

For example, a floppy disk, a hard disk, an optical disk, a magneto-optical (MO) disk, a compact disc read-only memory (CD-ROM), a compact disc recordable (CD-R), a compact disc rewritable (CD-RW), a magnetic tape, a non-volatile memory card, a ROM, a digital versatile disc read-only memory (DVD-ROM), or a DVD-R can be used as a recording medium for supplying the program.

In addition, the program can be obtained by connecting to a website on the Internet using a browser of a client computer and by downloading a computer program according to an aspect of the present invention or a compressed file having an automatic installation function from the website to a recording medium, such as a hard disk.

In addition, the program code may be supplied by dividing the program code constituting the program according to an aspect of the present invention into a plurality of files and by downloading the divided files from different websites. A World Wide Web (WWW) server for allowing a plurality of users to download a program file for attaining functional processing of an aspect of the present invention on a computer also falls within the scope of the present invention.

In addition, a program according to an aspect of the present invention may be encoded and stored in a storage medium, such as a CD-ROM, and may be distributed to users. Only a user who satisfies predetermined conditions may be able to download key information for decoding the encoded program from a website via the Internet. In addition, the program encoded using the downloaded key information can be executed and can be installed into a computer.

In addition, the functions of the above-described embodiments can be attained when the read program is executed by the computer. The functions of the above-described embodiments can also be attained when part or all of the actual processing is performed by an operating system (OS) or the like running on the computer on the basis of instructions of the program.

Furthermore, the program read from the recording medium may be written to a memory arranged in a function expansion board inserted in the computer or a function expansion unit connected to the computer. The functions of the above-described embodiments can also be attained when part or all of the actual processing is performed by a central processing unit (CPU) or the like arranged in the function expansion board or the function expansion unit on the basis of instructions of the program.

The above-described embodiments are merely examples for implementing the present invention. The technical scope of the present invention should not be limited by the above-described embodiments. Various changes and modifications may be made to the present invention without departing from the technical spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-211388 filed Aug. 14, 2007, which is hereby incorporated by reference herein in its entirety.

What is claimed is:

1. A communication control apparatus, comprising:
a packetizing unit configured to generate a plurality of packets based on coded image data corresponding to an image frame;
a determining unit configured to determine a number of packets to be transmitted, based on a system clock, based on at least one of (A) information regarding a data amount of the coded image data, (B) reception state information indicating a reception state of a reception device serving as a transmission destination to which the plurality of packets is to be transmitted, (C) information regarding an effective speed of a communication line to be used for transmission of the plurality of packets, and (D) information regarding an available capacity of a communication channel that can be ensured for communication of packets; and
a transmitting unit configured to transmit the generated plurality of packets based on the system clock such that first packets of the determined number are transmitted between a first timing according to a first system clock and a second timing according to a second system clock next to the first system clock, and second packets of the determined number are transmitted between the second timing and a third timing according to a third system clock next to the second system clock, wherein the first and second packets are generated by the packetizing unit based on the coded image data corresponding to the image frame,
wherein a time period between the first timing and the third timing is a time period within one frame time according to a frame rate.

2. The communication control apparatus according to claim 1, wherein the transmitting unit includes one of a section configured to cause the timing at which the transmission starts to be synchronized with the system clock and a section configured to calculate, based on the system clock, the timing at which the transmission starts.

3. The communication control apparatus according to claim 1, wherein one of the following is used as a frequency of the system clock: an audio sampling frequency, a horizontal synchronization frequency of a moving image signal, 90 KHz, a frequency obtained by multiplying one of the audio sampling frequency, the horizontal synchronization frequency, and 90 KHz by N, and a frequency obtained by dividing one of the audio sampling frequency, the horizontal synchronization frequency, and 90 KHz by N, wherein N is a positive integer.

4. The communication control apparatus according to claim 1, further comprising:
a storing unit configured to store, in a time-series manner, the reception state information indicating the reception state of the reception device serving as the transmission destination to which the plurality of packets are to be transmitted, the reception state information being transmitted from the reception device,
wherein the determining unit determines, based on the reception state information stored by the storing unit, at least one of how many packets can be transmitted as part of a group for which a probability of occurrence of packet loss is minimum, and how many packets can be transmitted as part of a group for which a probability of occurrence of overflow of a reception buffer provided in the reception device and a probability of occurrence of underflow of the reception buffer provided in the reception device are minimum.

5. The communication control apparatus according to claim 3, wherein the determining unit determines, by processing at least part of the reception state information stored by the storing unit in accordance with a statistical analysis method, how many packets can be transmitted as part of a group at a timing according to the system clock.

6. The communication control apparatus according to claim 1, further comprising:
a detecting unit configured to detect an image frame in which a coded mode of the coded image data is an intra-coded mode; and
an acquiring unit configured to acquire, in response to the detecting unit detecting the image frame in which the intra-coded mode is set, an amount of generated code that represents a quantity of generated code of the coded image data,
wherein the determining unit determines, in response to the detecting unit detecting the image frame in which the intra-coded mode is set, how many packets can be transmitted as part of a group at a timing according to the system clock.

7. A method for communication control, the method comprising:
generating a plurality of packets based on coded image data corresponding to an image frame;
determining a number of packets to be transmitted, based on a system clock, based on at least one of (A) information regarding a data amount of the coded image data, (B) reception state information indicating a reception state of a reception device serving as a transmission destination to which the plurality of packets is to be transmitted, (C) information regarding an effective speed of a communication line to be used for transmission of the plurality of packets, and (D) information regarding an available capacity of a communication channel that can be ensured for communication of packets; and
transmitting the generated plurality of packets based on the system clock such that first packets of the determined number are transmitted between a first timing according to a first system clock and a second timing according to a second system clock next to the first system clock, and second packets of the determined number are transmitted between the second timing and a third timing according to a third system clock next to the second system clock, wherein the first and second packets are generated by the generating based on the coded image data corresponding to the image frame,
wherein a time period between the first timing and the third timing is a time period within one frame time according to a frame rate.

8. A non-transitory computer-executable program stored in a computer-readable storage medium for causing a computer to perform a method for communication control, the method comprising:
generating a plurality of packets based on coded image data corresponding to an image frame;
determining a number of packets to be transmitted, based on a system clock, based on at least one of (A) information regarding a data amount of the coded image data, (B) reception state information indicating a reception state of a reception device serving as a transmission destination to which the plurality of packets is to be transmitted, (C) information regarding an effective speed of a communication line to be used for transmission of the plurality of packets, and (D) information regarding an available capacity of a communication channel that can be ensured for communication of packets; and transmitting the generated plurality of packets based on the system clock such that first packets of the determined number are transmitted between a first timing according to a first system clock and a second timing according to a second system clock next to the first system clock, and second packets of the determined number are transmitted between the second timing and a third timing according to a third system clock next to the second system clock, wherein the first and second packets are generated by the generating based on the coded image data corresponding to the image frame, wherein a time period between the first timing and the third timing is a time period within one frame time according to a frame rate.

\* \* \* \* \*